(12) United States Patent     (10) Patent No.:    US 9,179,448 B2
Seo et al.     (45) Date of Patent:    Nov. 3, 2015

(54) METHOD FOR REPORTING CHANNEL STATE INFORMATION IN WIRELESS COMMUNICATION SYSTEM AND DEVICE THEREFOR

(75) Inventors: Hanbyul Seo, Anyang-si (KR); Daewon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 13/993,025

(22) PCT Filed: Dec. 20, 2011

(86) PCT No.: PCT/KR2011/009845
§ 371 (c)(1),
(2), (4) Date: Jun. 10, 2013

(87) PCT Pub. No.: WO2012/086998
PCT Pub. Date: Jun. 28, 2012

(65) Prior Publication Data
US 2013/0258992 A1    Oct. 3, 2013

Related U.S. Application Data

(60) Provisional application No. 61/425,195, filed on Dec. 20, 2010.

(51) Int. Cl.
*H04W 28/04*       (2009.01)
*H04W 72/04*       (2009.01)
(Continued)

(52) U.S. Cl.
CPC ............ *H04W 72/04* (2013.01); *H04L 1/0026* (2013.01); *H04L 1/0027* (2013.01); *H04L 1/0031* (2013.01); *H04L 5/0023* (2013.01); *H04L 5/0057* (2013.01)

(58) Field of Classification Search
CPC ... H04W 28/04; H04W 72/04; H04W 72/042; H04W 88/08; H04L 5/0007; H04L 12/2623; H04L 12/2628; H04L 12/2803; H04L 12/2631
USPC ......................................................... 370/329
See application file for complete search history.

(56) References Cited

U.S. PATENT DOCUMENTS 8,428,633 B2 *   4/2013   Zhu et al. ....................... 455/517
8,681,627 B2 *   3/2014   Choudhury et al. ........... 370/235
(Continued)

FOREIGN PATENT DOCUMENTS

KR    10/2009-0076784 A     7/2009

OTHER PUBLICATIONS

Huawei, "Periodic CQI/PM/RI reporting for CA", 3GPP TSG RAN WG1 Meeting #63, R1-105833, Nov. 15-19, 2010.
(Continued)

*Primary Examiner* — Omar Ghowrwal
*Assistant Examiner* — Sanjay K Dewan
(74) *Attorney, Agent, or Firm* — Dentons US LLP

(57) ABSTRACT

The present invention relates to a wireless communication system. More specifically, the present invention relates to a method and a device for reporting channel state information, wherein the method comprises the steps of: receiving, from a first eNode B, a plurality of pieces of configuration information for a periodic report of CSIs that are set according to each eNode B; and transmitting, to said first eNode B, CSIs for the downlink of the corresponding eNode Bs through subframes that are periodically set according to each piece of the configuration information, wherein the subframes that are periodically set according to the configuration information for said first eNode B are used to transmit a CSI for the downlink of said first eNode B, and at least a portion of subframes that are periodically set according to configuration information for a second eNode B is used to transmit information which indicates the relationship between the downlink of said first eNode B and the downlink of said second eNode B.

4 Claims, 11 Drawing Sheets

(51) Int. Cl.
*H04W 88/08* (2009.01)
*H04L 1/00* (2006.01)
*H04L 5/00* (2006.01)
*H04W 4/00* (2009.01)

(56) References Cited

U.S. PATENT DOCUMENTS

| | | | |
|---|---|---|---|
| 2010/0002607 A1* | 1/2010 | Kim et al. | 370/280 |
| 2011/0019637 A1* | 1/2011 | Ojala et al. | 370/329 |
| 2011/0085587 A1* | 4/2011 | Moulsley et al. | 375/219 |
| 2012/0127869 A1* | 5/2012 | Yin et al. | 370/252 |
| 2012/0207047 A1* | 8/2012 | Liao et al. | 370/252 |
| 2012/0287875 A1* | 11/2012 | Kim et al. | 370/329 |
| 2012/0328035 A1* | 12/2012 | Yoon et al. | 375/260 |
| 2014/0092787 A1* | 4/2014 | Han et al. | 370/280 |
| 2014/0198677 A1* | 7/2014 | Xu et al. | 370/252 |

OTHER PUBLICATIONS

Ericsson, et al., "Periodic CSI reporting for CA", 3GPP TSG RAN WG1 Meeting #63, R1-105858, Nov. 15-19, 2010.
LG Electronics, "Periodic CSI transmission on PUCCH", 3GPP TSG RAN WG1 Meeting # 63, R1-106130, Nov. 15-19, 2010.

* cited by examiner

FIG. 2
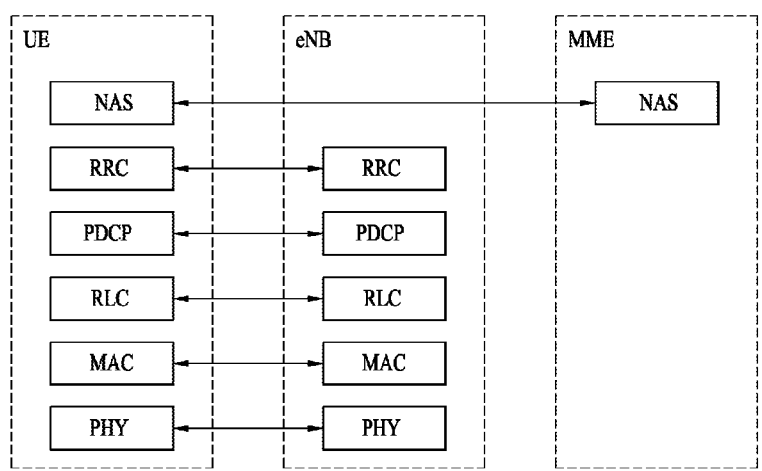
(a) control-plane protocol stack
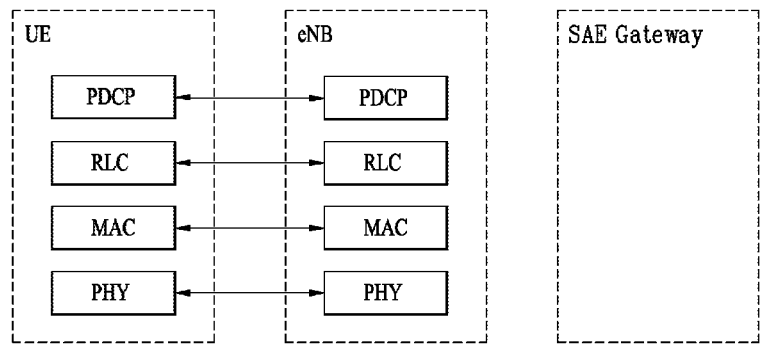
(b) user-plane protocol stack FIG. 8
| CQI reporting mode | | PMI feedback type | |
|---|---|---|---|
| | | no PMI | single PMI |
| PUCCH CQI feedback type | wideband (wideband CQI) | mode 1-0 | mode 1-1 |
| | UE-selected (subband CQI) | mode 2-0 | mode 2-1 |
FIG. 9
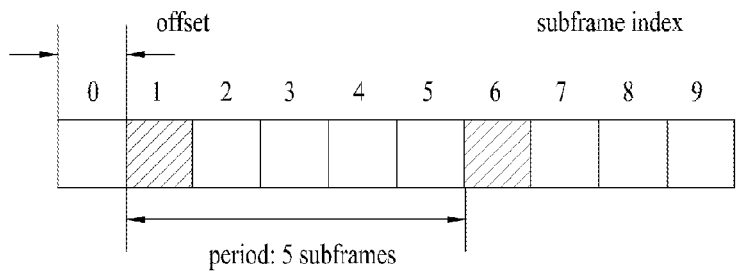
FIG. 10
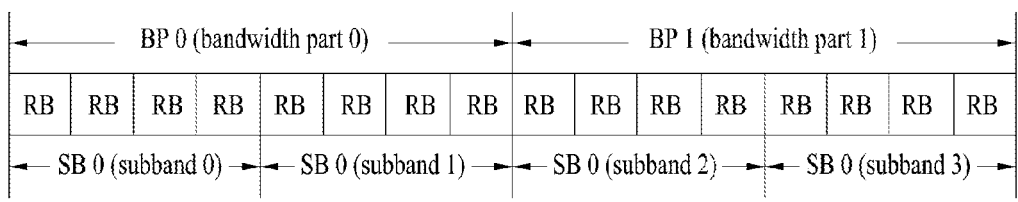

METHOD FOR REPORTING CHANNEL STATE INFORMATION IN WIRELESS COMMUNICATION SYSTEM AND DEVICE THEREFOR

This application is a 35 U.S.C §371 National Stage Entry of International Application No. PCT/KR2011/009845, filed Dec. 20, 2011 and claims the benefit of U.S. Provisional Application No. 61/425,195, filed Dec. 20, 2010, all of which are incorporated by reference in their entirety herein.

TECHNICAL FIELD

The present invention relates to a wireless communication system and, more particularly, to a method and device for reporting channel state information in a wireless communication system.

BACKGROUND ART

3GPP LTE ($3^{rd}$ Generation Partnership Project Long Term Evolution, referred to as 'LTE' hereinafter) will now be described as an exemplary wireless communication system to which the present invention is applicable.

FIG. 1 illustrates an E-UMTS (Evolved Universal Mobile Telecommunications System) as a wireless communication system. The E-UMTS is a system evolved from UMTS (Universal Mobile Telecommunications System) and currently standardized in 3GPP. The E-UMTS may be referred to as an LTE (Long Term Evolution) system. For details of the technical specifications of UMTS and E-UMTS, refer, respectively, to Release 7 and Release 8 of "$3^{rd}$ Generation Partnership Project; Technical specification Group Radio Access Network".

Referring to FIG. 1, the E-UMTS includes a user terminal (UE), an eNode B (eNB), and an access gateway (AG) located at the end of the network (E-UMTS) and connected to an external network. The eNB can simultaneously transmit multiple data streams for a broadcast service, multicast service and/or unicast service.

One or more cells are present per base station. A cell sets one of bandwidths of 1.25 MHz, 2.5 MHz, 5 MHz, 10 MHz, 15 MHz and 20 MHz for a carrier and provides downlink/uplink transmission service to a plurality of UEs. Different cells may provide different bandwidths. An eNB controls data transmission/reception to/from a plurality of UEs. The eNB transmits downlink scheduling information about downlink data to a UE to inform the UE of a time/frequency region in which the downlink data will be transmitted, coding information, data size, hybrid automatic repeat and request (HARQ) related information, etc. The eNB transmits uplink scheduling information about uplink data to the UE to inform the UE of a time/frequency region that can be used by the UE, coding information, data size, HARQ related information, etc. An interface for user traffic or control traffic transmission may be used between eNBs.

While wireless communication technology has been developed into LTE based on wideband code division multiple access (WCDMA), demands and expectations of users and providers continue to increase. Furthermore, technical evolution is needed for future competitiveness of wireless communication technology since other wireless access technologies are under development. For technical evolution, reduction of cost per bit, service availability increase, flexible use of frequency band, simplified structure, open interface, appropriate power consumption of terminals, etc. are required.

DISCLOSURE

Technical Problem

An object of the present invention devised to solve the problem lies in a method and device for reporting channel state information in a wireless communication system.

Technical Solution

The object of the present invention can be achieved by providing a method for reporting Channel State Information (CSI) at a User Equipment (UE) in a wireless communication system, including: receiving a plurality of configuration information for a periodic CSI report from a first base station, each configuration information being configured per base station; and transmitting CSI for a downlink of a corresponding base station to the first base station through subframes periodically configured according to each configuration information, wherein subframes periodically configured according to the configuration information for the first base station are used to transmit CSI for the downlink of the first base station, wherein at least a portion of subframes periodically configured according to the configuration information for a second base station is used to transmit information indicating a relation between the downlink of the first base station and the downlink of the second base station.

In another aspect of the present invention, provided herein is a UE configured to transmit Channel State Information (CSI) in a wireless communication system, including: a radio frequency (RF) module; and a processor, the processor configured to receive a plurality of configuration information for a periodic CSI report from a first base station, each configuration information being configured per base station, and to transmit CSI for a downlink of a corresponding base station to the first base station through subframes periodically configured according to each configuration information, wherein subframes periodically configured according to the configuration information for the first base station are used to transmit CSI for the downlink of the first base station, wherein at least a portion of subframes periodically configured according to the configuration information for the second base station is used to transmit information indicating a relation between the downlink of the first base station and the downlink of the second base station.

The plurality of configuration information for a periodic CSI report may include a plurality of configuration information for a periodic report of rank indicators (RIs).

Subframes for an RI, periodically configured according to the configuration information for the first base station, may be used to transmit the RI for the downlink of the first base station and subframes for an RI, periodically configured according to the configuration information for the second base station, may be used to transmit information indicating the relation between the downlink of the first base station and the downlink of the second base station.

The information indicating the relation between the downlink of the first base station and the downlink of the second base station may include information indicating the relative channel state between downlink signals of the two base stations.

The information indicating the relative channel state may include information indicating a phase difference or an amplitude difference between the downlink signals of the two base stations.

The first base station may be a serving base station and the second base station may be a cooperative base station.

Advantageous Effects

According to the present invention, it is possible to report channel state information in a wireless communication system more effectively.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

FIG. 2 illustrates a control plane and a user plane of a radio interface protocol between a UE and E-UMTS based on the 3GPP wireless access network specification.

FIGS. 8 to 11 illustrate periodic channel state information reporting.

BEST MODE

Figure 1:
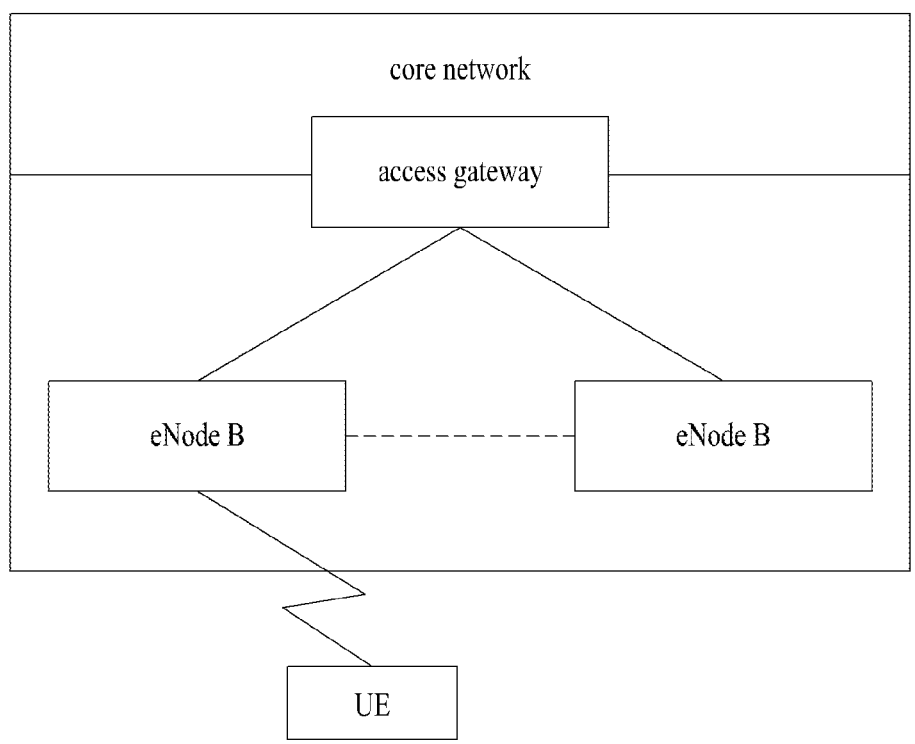
FIG. 1 illustrates E-UMTS as an exemplary wireless communication system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In embodiments described below, technical features of the present invention are applied to 3GPP.

While the following description focuses on LTE and LTE-A, this is purely exemplary and thus should not be construed as limiting the present invention. Furthermore, while the following description is given based on FDD, embodiments of the present invention can be applied to H-FDD or TDD.

FIG. 2 illustrates a control plane and a user plane of a radio interface protocol between a UE and E-UMTS based on the 3GPP wireless access network specification. The control plane refers to a path through which control messages that a UE and a network use to manage a call are transmitted. The user plane refers to a path through which data generated in an application layer, for example, audio data or Internet packet data is transmitted.

A physical layer, a first layer, provides an information transfer service to a higher layer using a physical channel. The physical layer is linked to a medium access control (MAC) layer corresponding to a higher layer through a transport channel. Data is transmitted between the MAC layer and the physical layer through the transport channel. Data is transmitted between physical layers of a transmitter and a receiver through a physical channel. The physical channel uses time and frequency as radio resources. Specifically, the physical layer is modulated according to OFDMA (Orthogonal Frequency Division Multiple Access) on downlink and modulated according to SC-FDMA (Single Carrier Frequency division Multiple Access) on uplink.

The MAC layer, a second layer, provides a service to a radio link control (RLC) layer corresponding to a higher layer through a logical channel. The RLC layer supports reliable data transmission. Functions of the RLC layer may be implemented as functional blocks in the MAC layer. A PDCP (Packet Data Convergence Protocol) layer, a second layer, performs a header compression function of reducing unnecessary control information to efficiently transmit an IP packet such as IPv4 or IPv6 in a radio interface having a narrow bandwidth.

An RRC (Radio Resource Control) layer corresponding to the lowest of three layers is defined only in the control plane. The RRC layer controls logical channels, transport channels and physical channels with respect to configuration, reconfiguration and release of radio bearers (RBs). An RB refers to a service provided by the second layer for data transmission between a UE and a network. For data transmission between the UE and network, RRC layers of the UE and network exchange RRC messages. The UE is in an RRC connected mode when the RRC layers of the UE and network are RRC connected and is otherwise in an idle mode. A NAS (Non-Access Stratum) layer higher than the RRC layer performs session management and mobility management.

A cell constituting an eNB is set to one of bandwidths of 1.25 MHz, 2.5 MHz, 5 MHz, 10 MHz, 15 MHz and 20 MHz and provides a downlink or uplink transmission service to a plurality of UEs. Different cells may provide different bandwidths.

Downlink transport channels for transmitting data from a network to a UE include a broadcast channel (BCH) for transmitting system information, a paging channel (PCH) for transmitting a paging message, a downlink shared channel (SCH) for transmitting a user traffic or control message, etc. A traffic or control message of downlink multicast or broadcast service may be transmitted through the downlink SCH or a downlink multicast channel (MCH). Uplink transport channels for transmitting data from a UE to a network include a random access channel (RACH) for transmitting an initial control message and an uplink SCH for transmitting a user traffic or control message. Logical channels which are higher than transport channels and are mapped to the transport channels include a broadcast control channel (BCCH), a paging control channel (PCCH), a common control channel (CCCH), a multicast control channel (MCCH), a multicast traffic channel (MTCH), etc.

Figure 3:
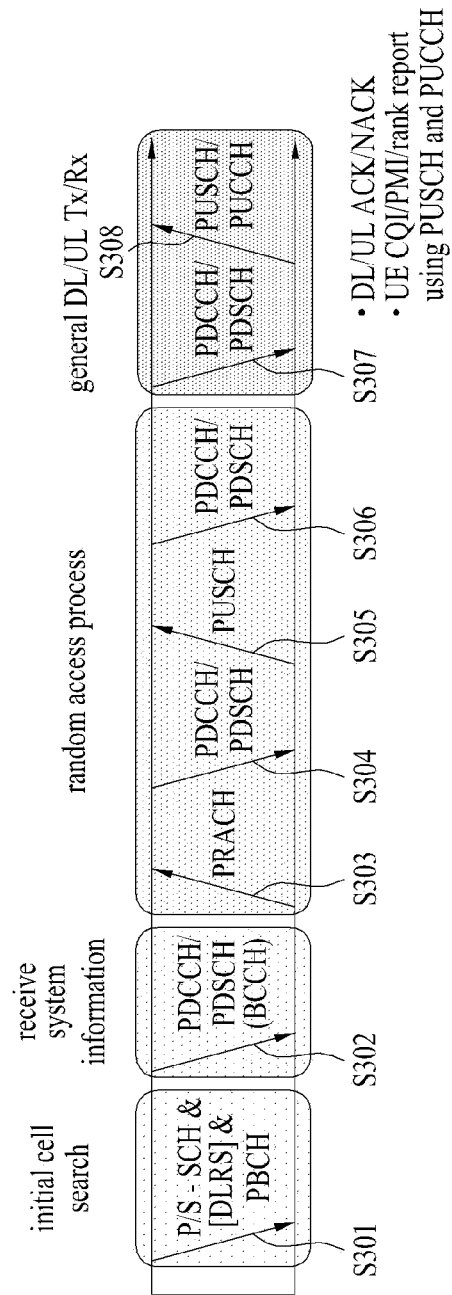
FIG. 3 illustrates physical channels used for a 3GPP system and a method of transmitting a signal using the physical channels.

FIG. 3 illustrates physical channels used for a 3GPP system and a method of transmitting a signal using the physical channels.

When powered on or when a UE initially enters a cell, the UE performs initial cell search involving synchronization with an eNB (S301). For initial cell search, the UE is synchronized with the eNB and acquires information such as a cell ID by receiving a primary synchronization channel (P-SCH) and a secondary synchronization channel (S-SCH)

from the eNB. Then the UE may receive broadcast information from the eNB on a physical broadcast channel. The UE may determine a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH (S302).

When the UE initially accesses the eNB or there is no radio resource for signal transmission, the UE may perform a random access procedure (RACH) to access the eNB (S303 to S306). For random access, the UE may transmit a preamble to the eNB on a physical random access channel (PRACH) (S303 and S305) and receive a response message for preamble on a PDCCH and a PDSCH corresponding to the PDCCH (S304 and S306). In the case of contention-based random access, the UE may additionally perform a contention resolution procedure.

After the foregoing procedure, the UE may receive a PDCCH/PDSCH (S307) and transmit a physical uplink shared channel (PUSCH)/physical uplink control channel (PUCCH) (S308), as a general downlink/uplink signal transmission procedure. Particularly, the UE receives downlink control information (DCI) through a PDCCH. The DCI includes control information such as information about allocation or resources to the UE and a format thereof is designed according to application.

Control information transmitted from the UE to the eNB or control information transmitted from the eNB to the UE through uplink includes a downlink/uplink ACK/NACK signal, a channel quality indicator (CQI), a precoding matrix index (PMI), a rank indicator (RI), etc. In the case of 3GPP LTE, the UE can transmit the CQI/PMI/RI on a PUSCH and/or a PUCCH.

Figure 4:
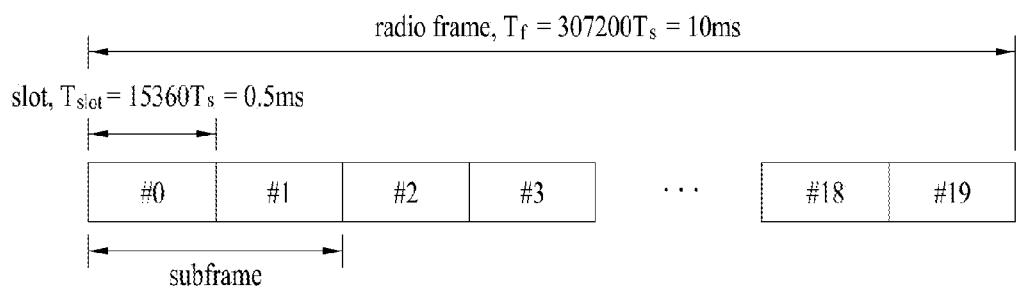
FIG. 4 illustrates a radio frame structure used in LTE.

FIG. 4 illustrates a radio frame structure used in LTE.

Referring to FIG. 4, a radio frame has a length of 10 ms (307200×Ts) and includes 10 subframes of equal size. Each subframe has a length of 1 ms and includes two slots. Each slot has a length of 0.5 ms (15360×Ts). Here, Ts denotes sampling time and is represented as Ts=1/(15 kHz×2048)= 3.1552×10$^{-8}$ (about 33 ns). Each slot includes a plurality of OFDM symbols in the time domain and a plurality of resource blocks in the frequency domain. In LTE, one resource block (RB) includes (12 subcarriers×7 (or 6) OFDM symbols). A unit time for transmitting data, a transmission time interval (TTI), may be defined based on one or more subframes. The above-described radio frame structure is exemplary and the number of subframes included in a radio frame, the number of slots included in a subframe, and the number of OFDM symbols included in a slot may be modified in various manner.

Figure 5:
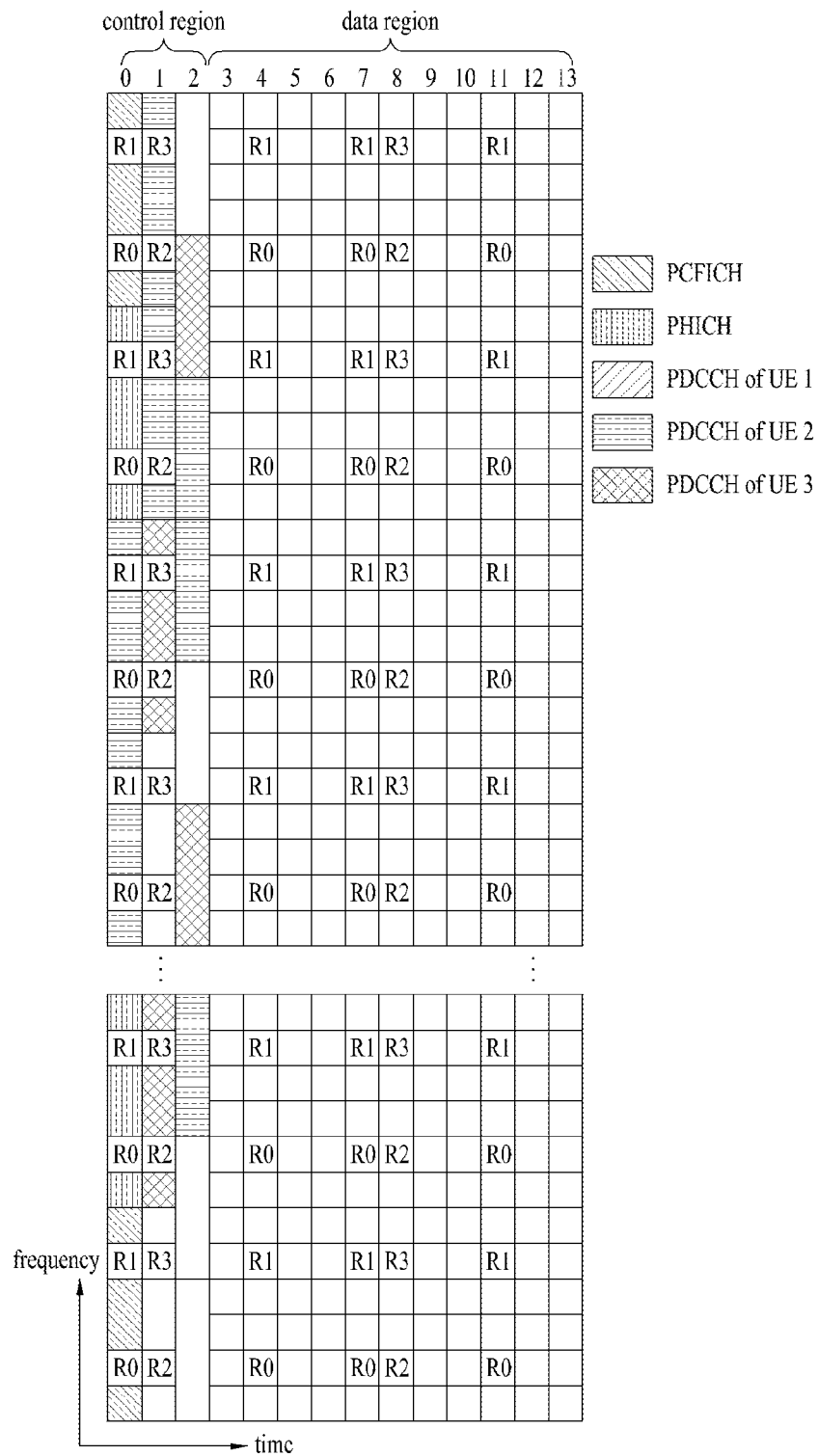
FIG. 5 illustrates a downlink radio frame structure used in LTE.

FIG. 5 illustrates control channels included in a control region of a subframe in a downlink radio frame.

Referring to FIG. 5, a subframe includes 14 OFDM symbols. One to three OFDM symbols located in a front portion of the subframe are used as a control region and the remaining eleven to thirteen OFDM symbols are used as a data region. In FIG. 5, R1 to R4 denote reference signals (RSs) or pilot signals with respect to antennas #0 to #3. RSs are fixed in a predetermined pattern within the subframe irrespective of the control region and the data region. Control channels are allocated to resources to which RSs are not assigned in the control region and traffic channels are allocated to resources to which RSs are not assigned in the data region. Control channels allocated to the control region include a physical control format indicator channel (PCFICH), a physical hybrid-ARQ indicator channel (PHICH), a physical downlink control channel (PDCCH), etc.

The PCFICH informs a UE of information regarding the number of OFDM symbols used for a PDCCH for each subframe. The PCFICH is transmitted at the first OFDM symbol and set prior to the PHICH and PDCCH. The PHICH is composed of 4 resource element groups (REGs) which are dispersed in the control region based on cell ID. One REG includes 4 resource elements (REs). An RE is a minimum physical resource defined by (a subcarrier×an OFDM symbol). PCFICH values indicate 1 to 3 or 2 to 4 and modulated according to quadrature phase shift keying (QPSK).

The PHICH is a HARQ indicator channel and is used to carry HARQ acknowledgment (ACK)/negative-acknowledgment (NACK) signal for uplink transmission. That is, DL ACK/NACK information for UL HARQ is transmitted on the PHICH. The PHICH is composed of one REG and is cell-specifically scrambled. ACK/NACK is a 1-bit signal and is modulated according to binary phase shift keying (BPSK). Modulated ACK/NACK is spread with a spreading factor (SF) of 2 or 4. A plurality of PHICHs mapped to the same resource form a PHICH group. The number of PHICHs multiplexed to the PHICH group is determined by the number of spreading codes. The PHICH (group) is repeated three times to obtain diversity gain in the frequency domain and/or time domain.

The PDCCH is allocated to n OFDM symbols located in the front portion of the subframe. Here, n is an integer greater than 1 and is indicated by the PCFICH. The PDCCH is composed of one or more CCEs. The PDCCH carries information regarding resource allocation of a PCH and DL-SCH, uplink scheduling grant, HARQ information, etc. to each UE or UE group. The PCH and DL-SCH are transmitted on a PDSCH. Accordingly, an eNB and a UE generally transmit and receive data through the PDSCH except for specific control information or specific service data.

Information about one or more UEs to which data of the PDSCH will be transmitted and information about how the UEs receive and decode the PDSCH data are included in a PDCCH and transmitted. For example, if a specific PDCCH is CRC-masked with a radio network temporary identity (RNTI) "A" and information about data transmitted using a radio resource (e.g. frequency position) "B" and a DCI format "C", that is, transport format information (e.g. transport block size, modulation scheme, coding information, etc.) is transmitted through a specific subframe, a UE in a cell monitors the PDCCH using RNTI information included therein. If one or more UEs include the RNTI "A", the UEs receive the PDCCH and receive a PDSCH indicated by "B" and "C" through information of the received PDCCH.

Figure 6:
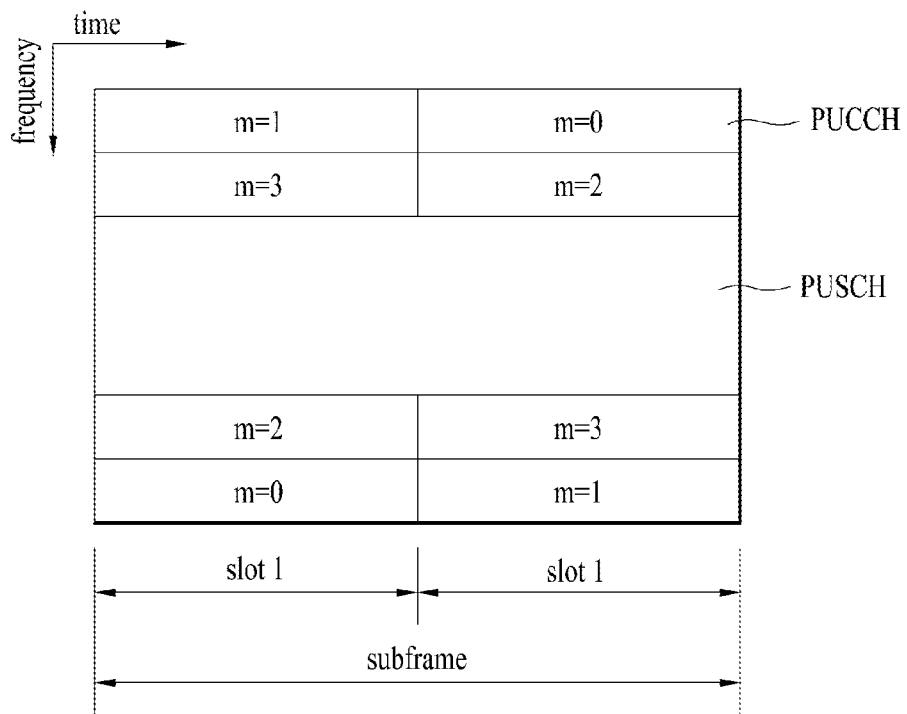
FIG. 6 illustrates an uplink radio frame structure used in LTE.

FIG. 6 illustrates an uplink subframe structure used in LTE.

Referring to FIG. 6, an uplink subframe can be divided into a region to which a physical uplink control channel (PUCCH) carrying control information is allocated and a region to which a physical uplink shared channel (PUSCH) carrying user data is allocated. The middle part of the subframe is allocated to the PUSCH and both sides of the data region in the frequency domain are allocated to the PUCCH. Control information transmitted on the PUCCH includes ACK/NACK used for HARQ, a CQI indicating a downlink channel state, an RI for MIMO, a scheduling request (SR) corresponding to an uplink resource allocation request, etc. A PUCCH for one UE uses a resource block occupying different frequencies in slots within the subframe. That is, 2 resource blocks allocated to the PUCCH are frequency hopped at the slot boundary. FIG. 6 illustrates allocation of a PUCCH with m=0, a PUCCH with m=1, a PUCCH with m=2 and a PUCCH with m=3 to the subframes.

A description will be given of a multiple-input multiple-output (MIMO) system. MIMO uses plural transmit antennas and plural receive antennas and can improve data transmission/reception efficiency. That is, the throughput and performance of a wireless communication system can be improved by using a plurality of antennas at a transmitter or a receiver of the wireless communication system. In the following, MIMO may be referred to as 'multi-antenna'.

MIMO does not depend on a single antenna path to receive a whole message. Rather, MIMO completes the message by combining data fragments received through a plurality of antennas. MIMO can increase data rate within a cell area having a specific size or extend system coverage at a given data rate. MIMO is broadly applicable to mobile terminals, relays, etc. It is possible to overcome the limit of throughput of conventional mobile communication sing a single antenna through MIMO.

Figure 7:
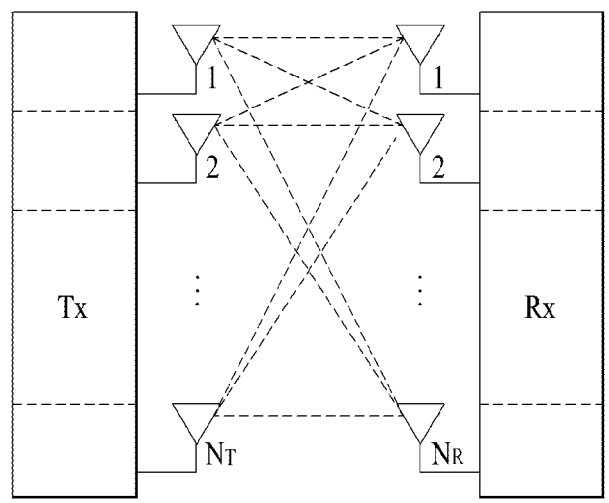
FIG. 7 illustrates a configuration of a MIMO communication system.

FIG. 7 illustrates a configuration of a typical MIMO communication system. When a transmitter uses $N_T$ transmit (Tx) antennas and a receiver uses $N_R$ receive (Rx) antennas, a theoretical channel transmission capacity is increased, compared to use of a plurality of antennas at only one of the transmitter and the receiver. Channel transmission capacity is increased in proportion to the number of antennas. Therefore, transmission rate and frequency efficiency can be increased. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas. Here, $R_i$ corresponds to the smaller of $N_T$ and $N_R$.

$$R_i = \min(N_T, N_R) \quad \text{[Equation 1]}$$

For instance, a MIMO communication system with 4 Tx antennas and 4 Rx antennas may theoretically achieve a four-fold increase in transmission rate, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. As illustrated in FIG. 7, it is assumed that $N_T$ Tx antennas and $N_R$ Rx antennas are present. Regarding a transmission signal, up to $N_T$ pieces of information can be transmitted through the $N_T$ Tx antennas, as expressed by the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmitted signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmitted signals $x_1, x_2, \ldots, x_{N_T}$ are represented as a vector X, which may be determined by Equation 5. Herein, $w_{ij}$ denotes a weight between an $i^{th}$ Tx antenna and a $j^{th}$ piece of information. W is called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the rank of a channel matrix physically means a maximum number of given channels through which different pieces of information can be transmitted. Accordingly, the rank of the channel matrix is defined as the lesser of the numbers of independent rows and columns. Accordingly, the rank of the channel matrix is not larger than the number of rows or columns. For example, the rank of the channel matrix H, rank(H) is limited by Equation 6.

$$\text{rank}(H) \leq \min(N_T, N_R) \quad \text{[Equation 6]}$$

Let information transmitted using MIMO be defined as 'transmission stream' or simply 'stream'. 'Stream' can also be referred to as 'layer'. The number of transmission streams cannot be larger than the channel rank. Accordingly, the channel matrix H can be expressed by Equation 7.

$$\text{\# of streams} \leq \text{rank}(H) \leq \min(N_T, N_R) \quad \text{[Equation 7]}$$

Here, "# of streams" denotes the number of streams. It is noted that one stream can be transmitted through one or more antennas.

There may be various methods for matching one or more streams to a plurality of antennas. These methods can be described according to MIMO types as follows. Transmission of one stream through a plurality of antennas can be considered as a spatial diversity scheme and transmission of a plurality of streams through a plurality of antennas can be considered as a spatial multiplexing scheme. A hybrid of the spatial diversity and spatial multiplexing is possible.

A description will be given of channel state information (CSI) reporting. Open-loop MIMO operating without CSI and closed-loop MIMO operating based on CSI are present in LTE. Particularly, in closed-loop MIMO, each of an eNB and a UE can perform beamforming based on CSI to obtain MIMO antenna multiplexing gain. To obtain CSI from the UE, the eNB instructs the UE to feed back CSI with respect to a downlink signal by allocating a PUCCH or a PUSCH to the UE.

CSI is categorized into an RI, PMI and CQI. The RI indicates rank information of a channel, as described above, and represents the number of streams that can be received by a UE through the same time-frequency resource. The RI is determined by long term fading of the channel, and thus the RI is fed back to an eNB at a longer period than PMI and CQI.

The PMI is a value in which spatial characteristics of a channel are reflected and indicates a precoding matrix index of an eNB preferred by a UE based on a metric such as SINR. The CQI indicates channel intensity and represents a reception SINR that can be obtained by the eNB using the PMI.

As described above, CSI includes a CQI, PMI and RI although it is not limited thereto in LTE, and all or some of the CQI, PMI and RI are transmitted according to the transmission mode of each UE. Periodic transmission of CSI is referred to as periodic reporting and transmission of CSI at the request of an eNB is referred to as aperiodic reporting. In the case of aperiodic reporting, a request bit included in uplink scheduling information transmitted from the eNB is sent to a UE. Then, the UE transmits CSI considering a transmission mode thereof to the eNB through a PUSCH. In the case of periodic reporting, a period and an offset of the period are semi-statically signaled to each UE through a higher layer signal on a subframe basis. Each UE delivers CSI considering the transmission mode thereof to the eNB through a PUCCH in a predetermined period. If uplink data is present in a subframe in which CSI is transmitted, the CSI is transmitted with the uplink data through a PUSCH. The eNB transmits transmission timing information suitable for each UE to each UE in consideration of channel state of each UE, UE distribution in a cell, etc. The transmission timing information includes a period in which CSI is transmitted, an offset, etc. and may be transmitted to each UE through an RRC message.

FIGS. 8 to 11 illustrate periodic CSI reporting in LTE.

Referring to FIG. 8, 4 CQI reporting modes are present in LTE. Specifically, the CQI reporting modes are categorized into a wideband (WB) CQI mode and a subband (SB) CQI mode according to CQI feedback type and into a no PI mode and a single PMI mode according to whether a PMI is transmitted. Each UE receives information composed of a combination of a period and an offset through RRC signaling for periodic CQI reporting.

FIG. 9 illustrates an example of transmitting CSI when information representing {period '5', offset '1'} is signaled to a UE. Referring to FIG. 9, upon reception of the information representing a period of '5' and an offset of '1', the UE transmits CSI in 5 subframes with an offset corresponding to one subframe from subframe #0 in a direction in which the subframe index increases. While the CSI is basically transmitted through a PUCCH, when a PUSCH for transmitting data is present in the same time, the CSI is transmitted with the data through the PUSCH. The subframe index is composed of a system frame number $n_f$ and a slot index $n_s$ (0 to 19). Since a subframe includes two slots, the subframe index can be defined by $10*n_f+floor(n_s/2)$. Here, floor( ) denotes a floor function.

A scheme of transmitting a WB CQI only and a scheme of transmitting both the WB CQI and SB CQI are present. According to the scheme of transmitting the WB CQI only, CQI information about the overall band is transmitted in subframes corresponding to a CQI transmission period. When a PMI also needs to be transmitted according to PMI feedback type, as illustrated in FIG. 8, the PMI and CQI are transmitted together. According to the scheme of transmitting both the WB CQI and SB CQI, the WB CQI and SB CQI are alternately transmitted.

FIG. 10 illustrates a system having a system bandwidth corresponding to 16 RBs. In this case, it is assumed that the system bandwidth is composed of two bandwidth parts (BPs) BP0 and BP1 each of which includes two subbands (SBs) SB0 and SB1 each of which is composed of 4 RBs. However, the number of BPs and the size of each SB may be varied according to system bandwidth. Furthermore, the number of SBs constituting each BP may depend on the number of RBs, the number of BPs and SB size.

In the case of the scheme of transmitting both the WB CQI and SB CQI, the WB CQI is transmitted in a first CQI transmission subframe and a CQI corresponding to the SB having a good channel state between SB0 and SB1 belonging to BP0 and the index of the corresponding SB are transmitted in the next CQI transmission subframe. Then, a CQI corresponding to the SB in good channel state between SB0 and SB1 belonging to BP1 and the index of the corresponding SB are transmitted in the next CQI transmission subframe. In this manner, the WB CQI is transmitted and then CQI information about respective BPs is sequentially transmitted. CQI information about BPs can be sequentially transmitted one to four times between two WB CQIs. For example, if CQI information about BPs is sequentially transmitted once between two WB CQIs, the CQI information can be transmitted in the order of WB CQI=>BP0 CQI=>BP1 CQI=>WB CQI. If CQI information about BPs is sequentially transmitted four times between two WB CQIs, the CQI information can be transmitted in the order of WB CQI=>BP0 CQI=>BP1 CQI=>BP0 CQI=>BP1 CQI=>BP0 CQI=>BP1 CQI=>BP0 CQI=>BP1 CQI=>WB CQI. Information about how many times each BP CQI is sequentially transmitted is signaled by a higher layer (e.g. RRC layer).

FIG. 11(a) illustrates an example of transmitting both the WB CQI and SB CQI when information representing {period '5', offset '1'} is signaled to a UE. Referring to FIG. 11(a), a CQI can be transmitted only in subframes corresponding to a signaled period and offset irrespective of CQI type. FIG. 11(b) illustrates a case in which an RI is additionally transmitted. The RI can be signaled by a higher layer (e.g. RRC layer) as a combination of information about a multiple of the WB CQI transmission period, which corresponds to an RI transmission period, and an offset in the RI transmission period. The offset of the RI is signaled as a value relative to the offset of the CQI. For example, if the offset of the CQI is '1' and the offset of the RI is '0', the RI has the same offset as that of the CQI. The offset of the RI is defined as 0 or a negative value. Specifically, FIG. 11(b) assumes a case in which the RI transmission period is equal to the WB CQI transmission period and the offset of the RI is '-1' in the same environment as FIG. 11(a). The RI transmission period is identical to the WB CQI transmission period since the RI transmission period is equal to the WB CQI transmission period. The offset of the RI is '-1', and thus the RI is transmitted on the basis of '-1' (i.e. subframe #0) with respect to the CQI offset '1'. When the RI offset is '0', the WB CQI transmission subframe and RI transmission subframe overlap. In this case, the WB CQI is dropped and the RI is transmitted.

A description will be given of conventional PUCCH power control. PUCCH power control includes support for carrier aggregation (CA). When CA is supported, a BS and a UE can perform communication using a plurality of component carriers. The term 'component carrier' is interchangeable with the term 'cell or (serving cell)' in terms of resource management. Where a plurality of serving cells is present, the serving cells include a primary cell and one or more secondary cells. Provided that a serving cell c is a primary cell, UE transmit power $P_{PUCCH}(i)$ for PUCCH transmission in a subframe i is represented by Equation 8.

$$P_{PUCCH}(i) = \min\begin{Bmatrix} P_{CMAX,c}(i), \\ P_{0\_PUCCH} + PL_c + h(\cdot) + \\ \Delta_{F\_PUCCH}(F) + \Delta_{T \times D}(F') + g(i) \end{Bmatrix} [dBm]$$ [Equation 8]

$P_{CMAX,c}$ (i) denotes maximum transmit power of a UE, set for the serving cell c.

$P_{O\_PUCCH}$ is a parameter corresponding to the sum of $P_{O\_NOMINAL\_PUCCH}$ and $P_{O\_UE\_PUCCH}$. $P_{O\_NOMINAL\_PUCCH}$ and $P_{O\_UE\_PUCCH}$ are provided by a higher layer (RRC).

$PL_c$ represents a downlink path loss estimate of the serving cell c.

A parameter $\Delta_{F\_PUCCH}$ (F) is provided by a higher layer. $\Delta_{F\_PUCCH}$ (F) indicates a value corresponding to the related PUCCH format with respect to PUCCH format 1a.

When the UE is configured to transmit a PUCCH through two antenna ports using a higher layer, a parameter $\Delta_{T \times D}(F')$ is provided by the higher layer. When the UE is configured to transmit a PUCCH through a single antenna port, $\Delta_{T \times D}(F')$ is 0. That is, $\Delta_{T \times D}(F')$ corresponds to a power compensation value considering antenna port transmission mode.

$h(\cdot)$ is a PUCCH format dependent value. $h(\cdot)$ is a function having at least one of $n_{CQI}$, $n_{HARQ}$ and $n_{SR}$ as a parameter. Here, a CQI is equivalent to CSI. CSI is transmitted through PUCCH formats 2, 2a and 2b and $h(\cdot)$ therefor is as follows.

In the case of PUCCH formats 2, 2a and 2b and a normal cyclic prefix (CP), $h(\cdot)$ is given as $$h(\cdot) = \begin{cases} 10\log_{10}\left(\frac{n_{CQI}}{4}\right) & \text{if } n_{CQI} \geq 4 \\ 0 & \text{otherwise} \end{cases}$$

In the case of PUCCH format 2 and extended CP, $h(\cdot)$ is given as $$h(\cdot) = \begin{cases} 10\log_{10}\left(\frac{n_{CQI} + n_{HARQ}}{4}\right) & \text{if } n_{CQI} + n_{HARQ} \geq 4 \\ 0 & \text{otherwise.} \end{cases}$$

Here, $n_{CQI}$ denotes a power compensation value related to CSI. Specifically, $n_{CQI}$ is the number of information bits for CSI. In addition, $n_{HARQ}$ represents a power compensation value related to HARQ-ACK. Specifically, $n_{HARQ}$ is the number of (effective) information bits of HARQ-ACK.

According to the above expressions, the number of bits of CSI does not affect PUCCH power control when the number of bits of CSI is 0 to 3, whereas PUCCH power increases in proportion to the number of bits of CSI when the number of bits of CSI is greater than 4.

In Equation 8, g(i) represents current PUCCH power control adjustment state. Specifically, g(i) can be given as $$g(i) = g(i-1) + \sum_{m=0}^{M-1} \delta_{PUCCH}(i - k_m).$$

Here, g(0) is the first value after reset and $\delta_{PUCCH}$ is a UE specific correction value and is also referred to as a TPC command. In the case of a primary cell, $\delta_{PUCCH}$ is included in a PDCCH in DCI format 1A/1B/1D/1/2A/2/2B/2C. In addition, $\delta_{PUCCH}$ is jointly coded with another UE specific PUCCH correction value on a PDCCH in DCI format 3/3A.

In order to improve data rate, LTE-A is expected to support coordinated multi-point (CoMP) transmission, which was not supported by legacy standards. CoMP transmission refers to a scheme through which two or more points (e.g. eNBs or cells) cooperatively communicate with UEs to improve the performance of communication between a UE and an eNB (cell or sector) located in a shadow area.

CoMP transmission schemes may be categorized into joint processing (CoMP-JP) in the form of coordinated MIMO through data sharing and scheduling/beamforming (CoMP-CS/CB).

In the case of downlink, a UE can simultaneously receive data from plural eNBs that perform CoMP transmission, thereby improving reception performance by combining signals received from the eNBs according to CoMP-JT (Joint transmission (JT)). A method by which one of eNBs that perform CoMP transmission transmits data to the UE at a specific time (dynamic point selection (DPS)) may be considered. According to CoMP-CS/CB, the UE can instantaneously receive data from an eNB, specifically a serving eNB, through beamforming.

Figure 12:
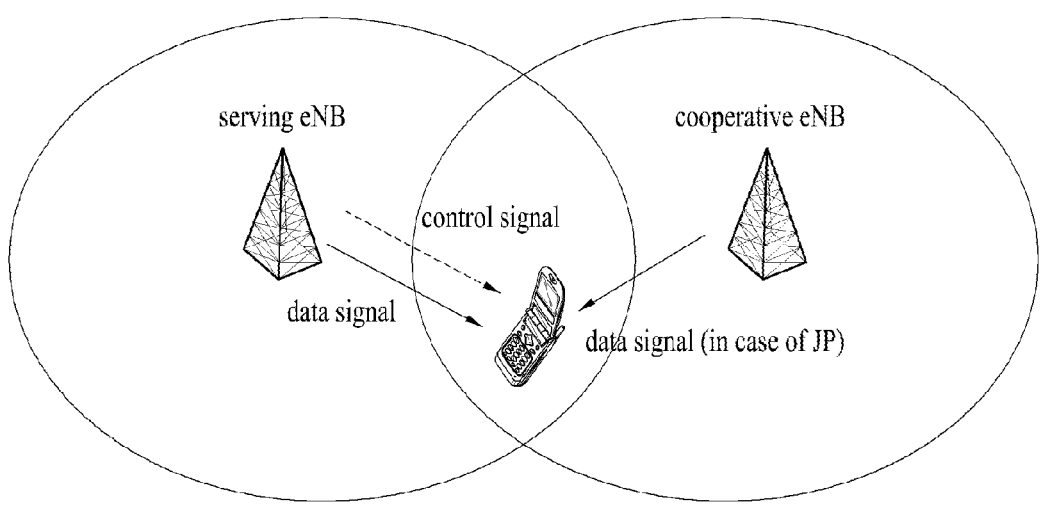
FIG. 12 illustrates a coordinated multi-point (CoMP) transmission system.

FIG. 12 illustrates an exemplary CoMP transmission system. In FIG. 12, a UE, i.e., a CoMP UE, is assumed to receive control information from a serving eNB (s-eNB) to enable CoMP operation. Furthermore, it is assumed that data are simultaneously transmitted from the s-eNB and a cooperative eNB (c-eNB) according to CoMP JP. When CoMP CS/CB is employed, data information is transmitted from the s-eNB only. In the case of DPS, data is transmitted from only an eNB dynamically selected from a cooperative set composed of the s-eNB and one or more c-eNBs. In CoMP, the term 'eNB' is interchangeable with the term 'cell', 'point', etc.

While FIG. 12 illustrates only one c-eNB, the present invention is applicable to a coordinative set including a plurality of c-eNBs. Furthermore, the present invention can be applied to not only inter-site CoMP in which an s-eNB and a c-eNB are separated by a large distance, as illustrated in FIG. 12, but also intra-site CoMP in which eNBs in a coordinative set are geographically co-located or heterogeneous networks including a hybrid of inter-site CoMP and intra-site CoMP.

For CoMP transmission, higher CSI accuracy is required. For example, multiple eNBs cooperatively transmit the same data to a specific UE in the CoMP JT system, and thus the CoMP JT system can be regarded as a MIMO system in which antennas are geographically distributed. Accordingly, JT based MU-MIMO requires high CSI accuracy like single-cell MU-MIMO. In the case of CoMP CB, accurate CSI is needed in order to avoid interference of a neighboring cell, applied to a serving cell.

The present invention proposes a method by which a UE periodically feeds back CSI of each eNB (or cell) in a cooperative cell for CoMP operation (e.g. CS/CB, JP, etc.), preferably, CoMP JP operation.

The present invention assumes that a serving eNB indicates periodic CSI reporting configuration to a UE for each eNB. Specifically, N eNBs (or cells) including the serving eNB are present in a coordinating set and N periodic CSI reporting configurations are transmitted to a UE that receives downlink signals from the N eNBs through JP or CS/CB. Each CSI reporting configuration is mapped to each coordinating point (i.e. coordinating eNB or coordinating cell). Each reporting configuration may be mapped to a CSI-RS configuration transmitted from the corresponding coordinating point.

Figure 11:
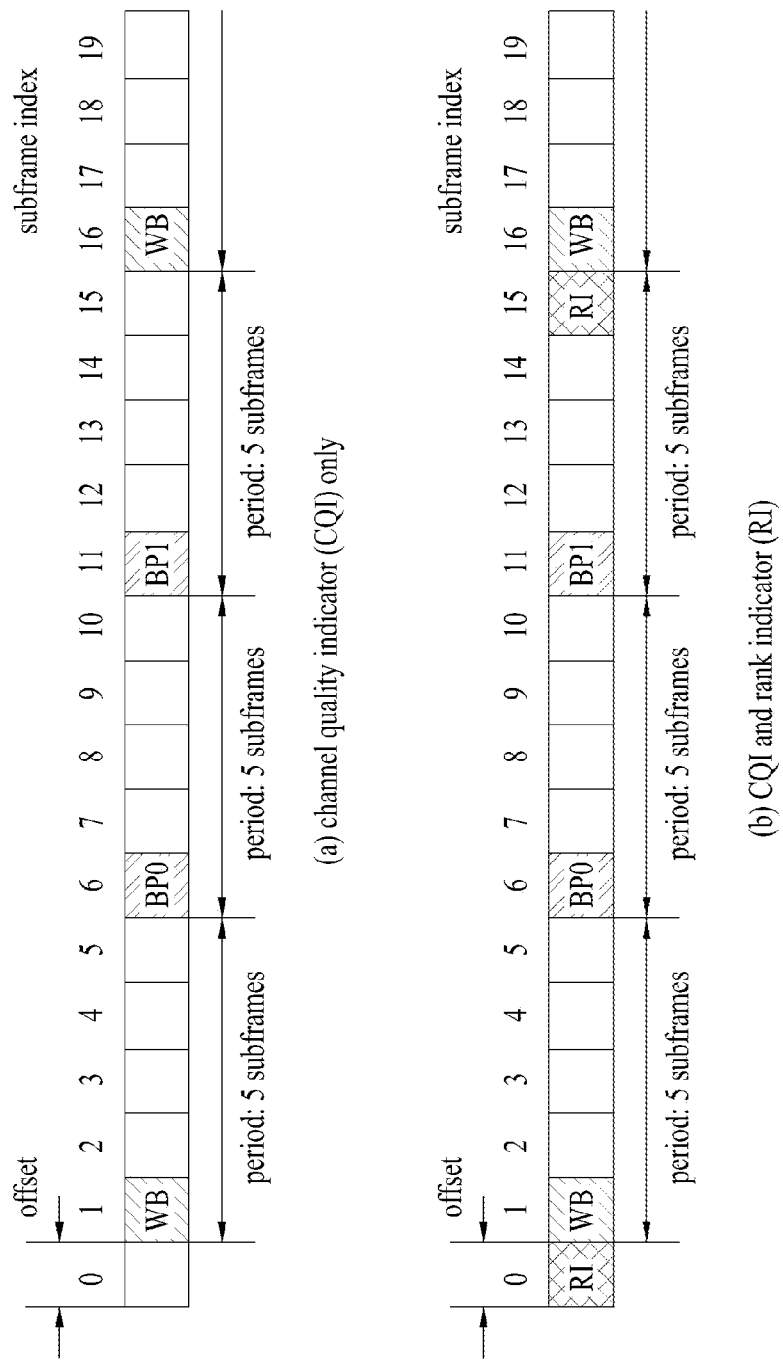

One of the periodic CSI reporting configurations needs to be mapped to the serving eNB and this mapping relationship can be fixed. For example, the CSI reporting configuration corresponding to the first index can be mapped to the serving eNB. In the case of CSI reporting for the serving eNB, the UE can conform to the reporting scheme defined in Rel-8/9/10 (refer to FIGS. 8 to 11). That is, the UE can report an RI/PMI/CQI with respect to the serving eNB at a time designated according to a conventional periodic reporting mode. Specifically, a CQI/PMI can be periodically transmitted, as illustrated in FIGS. 9 and 10 and an RI and CQI/PMI can be periodically transmitted, as illustrated in FIG. 11. RI transmission period and subframe offset are given as values relative to CQI transmission period and subframe offset.

In this case, the UE can calculate and feed back the RI/PMI/CQI for the serving eNB on the assumption that the UE operates in a single-cell mode (i.e. non-CoMP) according to the reporting mode defined in 3GPP Rel-8/9/10. Otherwise, CoMP operation may be assumed during calculation of the RI/PMI/CQI for the serving eNB. That is, the UE can calculate the RI/PMI/CQI for the serving eNB and feed back the calculated RI/PMI/CQI to the serving eNB on the assumption that CoMP is performed. In this case, the RI/PMI/CQI for the serving eNB can be calculated using separately fed back CSI of a coordinating eNB.

For CoMP operation performed by a coordinating eNB the following assumptions may be made.
1) No interference from the coordinating eNB is present.
2) The coordinating eNB does not perform CoMP operation.
3) Information about an effective channel to the coordinating eNB, measured after a process of receiving a serving eNB signal (or worst companion PMI(s) causing most intense interference during reception of the serving eNB signal) is provided as coordinating eNB CSI through the serving eNB and the coordinating eNB forms a beam with a space orthogonal to the reported effective channel.

The UE reports the CSI with respect to the coordinating eNB using the remaining N−1 CSI reporting configurations. Each CSI report corresponds to each coordinating eNB. A CSI reporting time for each coordinating eNB may be determined as defined in 3GPP Rel-8/9/10. Specifically, a CQI/PMI transmission time for each coordinating eNB can be periodically determined as illustrated in FIGS. 9 and 10 and an RI transmission time for each coordinating eNB can be periodically determined as illustrated in FIG. 11. As described above, the RI transmission period and subframe offset are given as values relative to the CQI transmission period and subframe offset.

Considering CoMP JT, it is desirable that an RI corresponding to a PMI of the serving eNB be identical to an RI corresponding to a PMI of a coordinating eNB because the same signal is simultaneously transmitted from the two eNBs and thus the two eNBs transmit same number of data layers in the case of JT. This means that the RI need not be reported when CSI for the coordinating eNB is reported. Accordingly, the present invention proposes utilization of a feedback source corresponding to the RI for the purpose of transmitting information other than the RI when the CSI for the coordinating eNB is reported.

For example, channel information between the serving eNB and a coordinating eNB is reported through the feedback resource corresponding to the RI when the CSI for the coordinating eNB is reported. Channel information between eNBs is referred to as inter-eNB CSI for convenience. The inter-eNB CSI includes relative channel information between the serving eNB and a coordinating eNB. However, the inter-eNB CSI is not limited thereto. The operation of reporting the inter-eNB CSI through the feedback resource corresponding to the RI can be implemented by reusing a period or a subframe offset that was used for RI reporting in 3GPP Rel-8/9/10 to configure periodic reporting. A period value or a subframe offset value from among parameters used for the RI may be excluded from an available parameter list as necessary.

Relative channel information may be information representing a phase difference between two eNBs or information representing an amplitude difference between the two eNBs. Particularly, the relative channel information is very important for CoMP JT because beamforming for appropriately compensating for a phase difference and an amplitude difference between the serving eNB and a coordinating eNB cannot be performed if the channel information between the two eNBs is not known so that optimized beamforming cannot be achieved and the intensity of a finally received signal remarkably decreases due to destructive interference between two signals. Accordingly, since a remarkably large loss may be generated when the relative channel information between the serving eNB and the coordinating eNB is lost, the relative channel information is desirably transmitted in a more stable manner using a PMI/CQI and a separate resource in the same manner as RI reporting according to 3GPP Rel-8/9/10. Here, a CQI with respect to the coordinating eNB may be a CQI obtained through appropriate assumption, for example, a CQI obtained through CoMP JT or a CQI that can be obtained when the coordinating eNB transmits a signal alone (assuming that the serving eNB does not interfere with the coordinating eNB, does not perform CoMP operation or performs beamforming such that the beamforming is orthogonal to a PMI reported as the PMI of the serving eNB). In this manner, a new CSI report such as channel information between eNBs can be fed back using the conventional periodic reporting configuration without additional overhead.

A CQI increment that can be obtained through CoMP JT can be fed back as relative channel information between two eNBs. For example, the CQI of the serving eNB is calculated as a CQI that can be obtained when the serving eNB transmits the CQI alone and then a CQI increase obtained when the serving eNB and a coordinating eNB perform CoMP JT is fed back as relative channel information. In this manner, a CQI transmittable when CoMP JT is performed can be calculated.

Replacement of the RI of the coordinating eNB by inter-eNB CSI in a subframe scheduled for RI feedback may be limited to a case in which CoMP JT is performed/assumed. Accordingly, the UE can adjust CSI feedback content depending on signaling of a CoMP mode from an eNB. For example, upon reception of information indicating CoMP JT from the serving eNB, the UE can transmit inter-eNB CSI instead of the RI of the coordinating eNB through a subframe scheduled for RI feedback during reporting of CSI for the coordinating eNB, as described above. Upon reception of information indicating CoMP CS/CB from the serving eNB, the UE can transmit the RI through the subframe scheduled for RI feedback during reporting of the CSI for the coordinating eNB.

Figure 13:
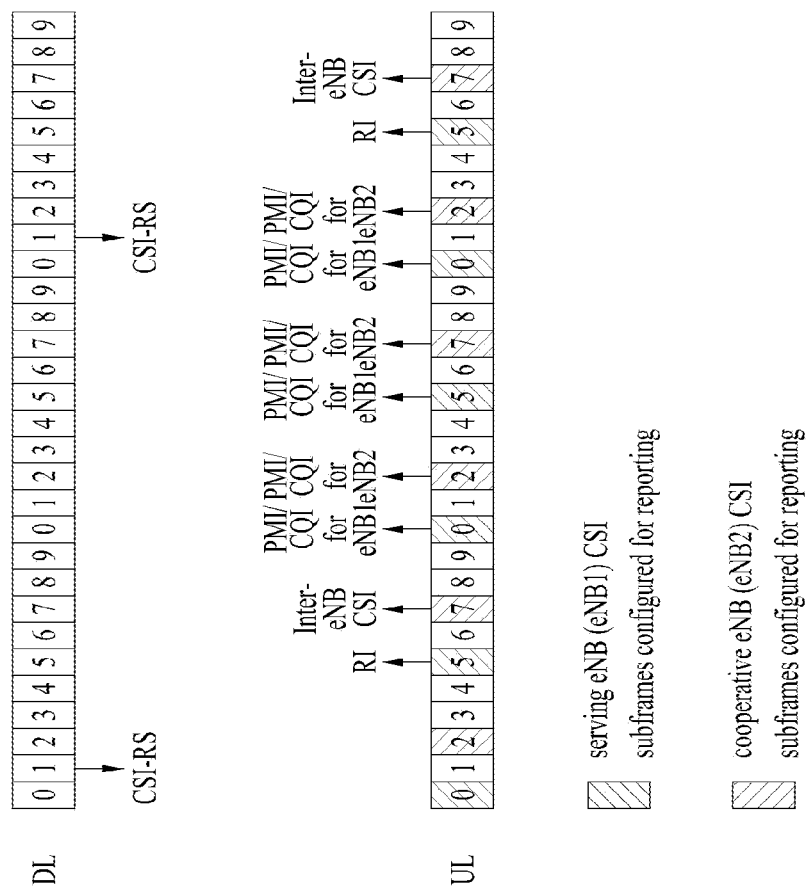
FIG. 13 illustrates a CoMP channel state information (CSI) feedback scheme according to an embodiment of the present invention.

FIG. 13 illustrates a CoMP CSI reporting method according to an embodiment of the present invention. Referring to FIG. 13, a UE reports CSI of a serving eNB eNB1 and a coordinating eNB eNB2 according to a periodic CSI reporting configuration set per eNB. It is assumed that a CSI reporting configuration for each eNB has a period of 5 ms and CSI reporting configurations of eNBs are discriminated using an offset of 2 ms. However, this CSI reporting configuration is exemplary and the number of coordinating eNBs and a CSI reporting configuration for each eNB can be set in various manners.

Specifically, FIG. 13 illustrates a case in which a CQI/PMI transmission period and a subframe offset are respectively set to 5 ms (i.e. 5 subframes) and 0 and an RI relative period and relative offset are respectively set to 4 (i.e. 20 ms) and 5 subframes through a CSI reporting configuration for the serving eNB eNB1. In the case of CSI reporting for eNB1, RI transmission time and CQI/PMI transmission time overlap at intervals of 20n+5 subframes and a CQI/PMI are dropped according to CSI transmission priority. In the case of CSI for the serving eNB, the UE can conform to the reporting scheme defined in 3GPP Rel-8/9/10. Accordingly, the CSI for eNB1 is fed back in the order of RI=>CQI/PMI=>CQI/PMI=>CQI/PMI and a feedback interval is 5 ms.

FIG. 13 also illustrates a case in which a CQI/PMI transmission period and a subframe offset are respectively set to 5 ms (i.e. 5 subframes) and 2 and an RI relative period and relative offset are respectively set to 4 (i.e. 20 ms) and 5 subframes through a CSI reporting configuration for the coordinating eNB eNB2. In the case of CSI reporting for eNB2, RI transmission time and CQI/PMI transmission time overlap at intervals of 20n+7 subframes and a CQI/PMI are dropped according to CSI transmission priority. In the case of CSI reporting for a coordinating eNB, a feedback resource for an RI of the coordinating eNB can be used for feedback of information (e.g. relative channel information) necessary for CoMP operation, as described above. Accordingly, the CSI for eNB2 can be fed back in the order of relative channel information (inter-eNB CSI)=>CQI/PMI=>CQI/PMI=>CQI/PMI, for example. Here, the relative channel information can represent a phase difference and/or an amplitude difference between the serving eNB and the coordinating eNB mapped thereto.

That is, in the case of CSI feedback for the serving eNB eNB1, the RI is transmitted at intervals of 20 ms and the CQI/PMI are transmitted at intervals of 5 ms. The CQI/PMI are dropped when the RI transmission time and the CQI/PMI transmission time overlap. In the case of CSI feedback for the coordinating eNB eNB2, relative channel information (inter-eNB CSI) between the two eNBs is transmitted at intervals of 20 ms using the RI feedback resource. The CQI/PMI for the coordinating eNB eNB2 are transmitted at intervals of 5 ms but dropped when the RI feedback resource transmission time and the CQI/PMI transmission time overlap. That is, while CSI reporting configurations for CoMP feedback are respectively set for eNBs according to the conventional scheme, the UE can change and report CSI feedback content depending on which eNB corresponds to reported CSI.

Inter-eNB CSI (e.g. relative channel information) may be more important than other channel information. Accordingly, the present invention proposes a method of additionally increasing PUCCH transmit power to more stable relative channel information transmission. For example, a PUCCH on which inter-eNB CSI is transmitted may be given an additional power offset of A dB (A>0), differently from a PUCCH on which CSI other than the inter-eNB CSI is transmitted.

Equation 9 represents an example of applying the additional power offset to the PUCCH power control calculation expression represented by Equation 8. Equation 9 can be used to obtain PUCCH formats 2, 2a and 2b.

$$P_{PUCCH}(i) = \min\begin{cases} P_{CMAX,c}(i), \\ P_{0\_PUCCH} + PL_c + h(\cdot) + \\ \Delta_{F\_PUCCH}(F) + \Delta_{TxD}(F') + g(i) + A \end{cases} [\text{dBm}] \quad [\text{Equation 9}]$$

Here, $P_{PUCCH}$ (i), $P_{CMAX,c}$(i), $P_{O\_PUCCH}$, $PL_c$, $h(\cdot)$, $\Delta_{F\_PUCCH}$ (F), $\Delta_{TxD}$(F) and g(i) are as defined in Equation 8. A is a positive value when inter-eNB CSI (e.g. relative channel information) is transmitted in a subframe i and is 0 otherwise.

Alternatively, the PUCCH on which the inter-eNB CSI is transmitted may set a transmission power higher than that of a PUCCH on which CSI other than the inter-eNB CSI is transmitted by modifying $h(\cdot)$ in Equation 8.

Equation 10 represents a case of PUCCH formats 2, 2a and 2b and normal CP and Equation 11 represents a case of PUCCH format 1 and extended CP.

$$h(\cdot) = \begin{cases} 10\log_{10}\left(\frac{n_{CQI}}{4}\right) + A & \text{else if } n_{CQI} \geq 4 \\ A & \text{otherwise} \end{cases} [\text{dBm}] \quad [\text{Equation 10}]$$

$$h(\cdot) = \begin{cases} 10\log_{10}\left(\frac{n_{CQI} + n_{HARQ}}{4}\right) + A & \text{if } n_{CQI} + n_{HARQ} \geq 4 \, [\text{dBm}] \\ A & \text{otherwise} \end{cases} \quad [\text{Equation 11}]$$

In Equations 10 and 11, $n_{CQI}$ and $n_{HARQ}$ are as defined in Equation 8 and A is positive value when the inter-eNB CSI (e.g. relative channel information) is transmitted in the subframe i and is 0 otherwise.

Equations 12 and 13 represent a case in which the PUCCH on which the inter-eNB CSI is transmitted sets a transmission power higher than that of a PUCCH on which CSI other than the inter-eNB CSI is transmitted by modifying $h(\cdot)$. Equation 12 represents a case of PUCCH formats 2, 2a and 2b and normal CP and Equation 13 represents a case of PUCCH format 1 and extended CP. It can be understood from Equations 12 and 13 that transmit power of the PUCCH on which the inter-eNB CSI (e.g. relative channel information) is transmitted is fixed to a specific value. Power control according to Equation 8 can be performed when the inter-eNB CSI (e.g. relative channel information) is 4 bits or more, whereas the power control scheme can be modified such that a predetermined power offset value for power increase is provided when the inter-eNB CSI is 3 bits or less.

$$h(\cdot) = \begin{cases} A & \text{if inter-eNB CSI is reported} \\ 10\log_{10}\left(\frac{n_{CQI}}{4}\right) & \text{else if } n_{CQI} \geq 4 \quad [\text{dBm}] \\ 0 & \text{otherwise} \end{cases} \quad [\text{Equation 12}]$$

-continued $$h(\cdot) = \begin{cases} A & \text{if inter-}eNB\text{ CSI is reported} \\ 10\log_{10}\left(\dfrac{n_{CQI}+n_{HARQ}}{4}\right) [\text{dBm}] & \text{else if } n_{CQI} \geq 4 \\ 0 & \text{otherwise} \end{cases}$$ [Equation 13]

In Equations 12 and 13, $n_{CQI}$ and $n_{HARQ}$ are as defined in Equation 8 and A is a positive value when the inter-eNB CSI (e.g. relative channel information) is transmitted in subframe i and is 0 otherwise.

Figure 14:
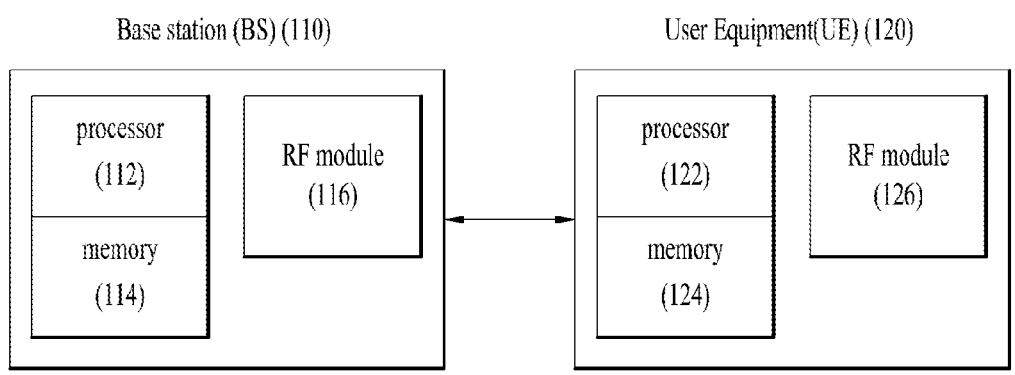
FIG. 14 illustrates a base station and a UE applicable to the present invention.

FIG. 14 illustrates a BS and a UE applicable to an embodiment of the present invention. In case of a wireless communication system including a relay, communication is performed between a BS and the relay in a backhaul link and between the relay and a UE in an access link. Accordingly, the BS or UE can be replaced by a relay as necessary.

Referring to FIG. 14, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

[Industrial Applicablity]

While application of the method and device for reporting channel state information in a 3GPP LTE wireless communication system has been described, the method and device for reporting channel state information in a wireless communication system can be applied to various wireless communication systems other than 3GPP LTE.

The invention claimed is:

1. A method for reporting Channel State Information (CSI) at a User Equipment (UE) in a wireless communication system, the method comprising:
   receiving, from a first base station, a plurality of configuration information for periodic Rank Indicator (RI) reporting, each of the plurality of configuration information is associated with a corresponding one of a plurality of base stations comprising a serving base station and one or more cooperative base stations;
   periodically configuring subframes in accordance with each of the plurality of received configuration information;
   transmitting, to the first base station, RI for a downlink of the first base station through subframes periodically configured according to configuration information associated with the first base station;
   transmitting, to the first base station, information including a relative channel state between a downlink signal of the first base station and a downlink signal of a second base station through subframes periodically configured according to configuration information associated with the second base station, wherein the UE communicates with both of the first base station and the second base station simultaneously at a certain time point; and
   receiving data from the first base station and the second base station cooperatively at the certain time point in consideration of the RI for the downlink of the first base station and the information including a relative channel state,
   wherein each of the plurality of configuration information indicates subframes in which RI for a downlink of each base station is reported periodically,
   wherein the RI for the downlink of the first base station is same as RI for the downlink of the second base station, wherein the first base station is the serving base station and the second base station is one of the cooperative base stations.

2. The method according to claim 1, wherein the information including a relative channel state between downlink signals of the first base station and the second base station includes a phase difference or an amplitude difference between the downlink signals of the two base stations.

3. A UE configured to transmit Channel State Information (CSI) in a wireless communication system, comprising:
   a radio frequency (RF) module; and
   a processor configured to control the RF module and configured to:
   receive, from a first base station, a plurality of configuration information for periodic Rank Indicator (RI) reporting, wherein each of the plurality of configuration information is associated with a corresponding one of a plurality of base stations comprising a serving base station and one or more cooperative base stations,
   configure subframes periodically in accordance with each of the plurality of received configuration information,
   transmit, to the first base station, RI for a downlink of the first base station through subframes periodically configured according to configuration information associated with the first base station,
   transmit, to the first base station, information including a relative channel state between a downlink signals of the first base station and a downlink signal of a second base station through subframes periodically configured according to configuration information associated with the second base station, wherein the UE communicates with both of the first base station and the second base station simultaneously at a certain time point, and
   receive data from the first base station and the second base station cooperatively at the certain time point in consideration of the RI for the downlink of the first base station and the information including a relative channel state,
   wherein each of the plurality of configuration information indicates subframes in which RI for a downlink of each base station is reported periodically,
   wherein the RI for the downlink of the first base station is same as RI for the downlink of the second base station,
   wherein the first base station is the serving base station and the second base station is one of the cooperative base stations.

4. The UE according to claim 3, the information including a relative channel state between downlink signals of the first base station and the second base station includes a phase difference or an amplitude difference between the downlink signals of the two base stations.

* * * * *